Patented Oct. 21, 1947

2,429,262

UNITED STATES PATENT OFFICE 2,429,262

MANUFACTURE OF HYDROGEN CYANIDE

Leonard Fallows and Eric Vernon Mellers, Spondon, near Derby, England, assignors to British Celanese Limited, London, England, a company of Great Britain No Drawing. Application December 12, 1944, Serial No. 567,900. In Great Britain February 1, 1944

12 Claims. (Cl. 23—151)

1

This invention relates to the manufacture of hydrogen cyanide by the thermal decomposition of formamide.

It is known that formamide, when heated to a sufficiently high temperature, is split into hydrogen cyanide and water. This is however not the only reaction which occurs, as the formamide molecule is also capable of splitting in an entirely different way, giving rise to ammonia and carbon monoxide. Moreover this second reaction may proceed to such an extent that the proportion of formamide converted to hydrogen cyanide is uneconomically low. It is an object of the present invention to obtain a good yield of hydrogen cyanide by the thermal decomposition of formamide.

According to the invention hydrogen cyanide is made by heating formamide vapour, in which a dehydrating catalyst is dispersed, to a temperature at which the formamide is decomposed into hydrogen cyanide and water. The term "dehydrating catalyst" as employed in this specification and in the claims includes substances which are converted into dehydrating catalysts under the conditions employed for the decomposition of the formamide.

As the dehydrating catalyst it is preferred to use phosphoric acid or a compound which under the conditions employed gives rise to phosphoric acid, for example ammonium monohydrogen or dihydrogen phosphate or an organic phosphate, for instance a lower tri-alkyl phosphate such as trimethyl phosphate or triethyl phosphate. The amount of the phosphorus compound used may be such as to give rise to a concentration of phosphoric acid in the formamide vapour between about 0.2 and 2% by weight, although more or less than these proportions may be present. For example triethyl phosphate may be introduced into the formamide vapour in amount between about 0.5 and 5% and especially between 1 and 3% of the formamide.

The thermal decomposition of the formamide is preferably effected at a temperature between about 300° and 700° C., temperatures of 450° to 650° C. being particularly useful. The pressure of the formamide vapour may be higher than atmospheric but preferably atmospheric pressure or a lower pressure is employed. If desired the formamide vapour may be diluted with a relatively inert gas or vapour, for example nitrogen, which may with advantage be preheated to the temperature at which the decomposition of the formamide is to take place. It is advisable to subject the vapours to the decomposition temperature for a short time only, e. g. for less than 8 seconds, and preferably for between 0.2 and 5 seconds, and then to cool the products rapidly.

In one method of working a suitable dehydrating catalyst may be mixed with liquid formamide in the desired proportion and the mixture vaporised and heated to the decomposition temperature. It is usually better, however, to vaporise the formamide and then to inject into a stream of the vapour the desired amount of catalyst. The vaporisation of the formamide is preferably effected very rapidly. For example the formamide may be introduced in a thin stream or in small discrete quantities into a flash boiler heated to a temperature above the boiling point of formamide, advantageously to 230°–300° C. or even higher. Into the stream of formamide vapour so produced the catalyst is injected. For example phosphoric acid or ammonium phosphate may be injected into the vapour stream in the form of a concentrated aqueous solution, or the phosphoric acid may be in solution in formamide. Trimethyl and triethyl phosphates, being themselves liquids, may if desired be injected without the aid of a solvent, but it is usually more convenient to add these compounds in solution in an organic solvent, for example in formamide or acetic acid. Advantageously the catalyst or catalyst solution may be preheated before it is injected into the formamide vapour.

The decomposition of the formamide vapour to hydrogen cyanide and water is preferably effected by passing the stream of vapour containing the catalyst through a long narrow tube which is heated to the required temperature. For example the vapour may be passed through a tube or set of tubes about 1–3 inches in diameter. The tubes may be of any suitable material, for example copper, and may contain a contact substance which aids the transfer of heat to the vapours, for example metal turnings, gauze or the like, or a substance capable of acting as a catalyst in the decomposition of formamide to hydrogen cyanide, for example an oxide of aluminium, chromium, zinc, manganese or tin, or phosphoric acid deposited on a material of high specific surface, e. g. silica gel, active charcoal or active alumina.

Although the tendency of the formamide to decompose into carbon monoxide and ammonia, instead of hydrogen cyanide and water, is reduced by the use of dispersed dehydration catalysts in accordance with the present invention, especially when the formamide is rapidly heated and the products are rapidly cooled, it is frequently advantageous to discourage still further this undesired reaction by carrying out the decomposition of the formamide in the presence of ammonia and/or added carbon monoxide. When ammonium phosphate is employed as the dispersed catalyst it breaks down to give ammonia and phosphoric acid, while when other catalysts are used, and indeed if desired also when ammonium phosphate is used, ammonia gas and/or carbon monoxide may be introduced into the formamide vapour, for example in amount between 50 and 150% by volume of the formamide vapour.

The gases and vapours leaving the decomposition zone may contain, besides the hydrogen cyanide and water vapour produced in the main reaction, unchanged formamide, some ammonia and carbon monoxide, and relatively small amounts of hydrogen, hydrocarbons and carbon dioxide. It is advantageous to render the gases and vapours substantially free from ammonia as soon as possible. This may be done by bringing them, preferably immediately after they have left the decomposition zone, into contact with a suitable acid; glacial acetic acid may with advantage be employed for this purpose, although other acids, e. g. hydrochloric acid, can be used if desired. The amount of acid used may be just enough, or slightly more than enough, to combine with all the ammonia present.

The hydrogen cyanide may be removed from the resulting mixture by reaction with an alkali to form a cyanide, but it is usually better to cool the gases and vapours strongly so as to condense the hydrogen cyanide. The condensate usually also contains unchanged formamide and small amounts of other substances such as phosphoric acid or other catalyst material, the acid used to remove the ammonia, and its ammonium salt. From the condensate the hydrogen cyanide can readily be separated by fractional distillation; from the residue the unchanged formamide may be separated by fractional distillation under reduced pressure, and is then available for re-use.

In the methods of putting the invention into practice which have been described above, the formamide vapour is made by evaporating liquid formamide. It may however be made by other methods, for example by rapidly heating ammonium formate to a temperature of at least 180° C. and preferably about 230° C. or higher.

The invention is illustrated by the following examples.

Example 1

Formamide was fed into a flash-boiler of copper, which was kept at a temperature of 250° C., and the vapour produced was led into a copper tube of diameter 2 inches, packed with copper gauze, and heated to 520° C. At the inlet end of the tube a solution of triethyl phosphate in formamide was injected at such a rate that the amount of triethyl phosphate injected was 2% of the total weight of formamide entering the tube. The rate of flow was such that the vapours passed through the tube in about 3.5 seconds.

The vapours leaving the tube were at once brought into contact with a stream of glacial acetic acid approximately equal in volume to the original liquid formamide fed to the boiler, and were then passed through an efficient water-cooled condenser. The condensate contained hydrogen cyanide, formamide, acetic acid and ammonium acetate, and the hydrogen cyanide was separated from the other components of the mixture by distillation.

Example 2

The decomposition of the formamide was carried out as described in Example 1, except that the time taken by the vapours to pass through the tube was about 2.5 seconds and the amount of triethyl phosphate was 1% of the weight of the formamide. The conversion to hydrogen cyanide was slightly lower than in Example 1.

Example 3

The decomposition of the formamide was carried out by the method described in Example 1. The decomposition tube was heated to 500° C., the time taken by the vapours to pass through the tube was about 2.5 seconds, and the catalyst consisted of phosphoric acid in amount 1.5% of the weight of the formamide, in solution in formamide or acetic acid. In place of the phosphoric acid the chemically equivalent quantity of an ammonium phosphate may be used.

Example 4

Formamide was vaporised in a copper flash-boiler at 250° C., and the vapour produced was led into a copper tube of diameter 1¼ inches packed with pieces of copper and heated to 650° C. The rate of flow of the formamide vapour through the tube was such that the vapour passed through the tube in about 0.5 second. The addition of the catalyst to the vapour entering the tube, and the treatment of the products of the reaction, were carried out as described in Example 1.

Having described our invention, what we desire to secure by Letters Patent is:

1. Process for the manufacture of hydrogen cyanide, which comprises injecting into a stream of formamide vapour a solution of a substance selected from the group which consists of phosphoric acid and compounds yielding phosphoric acid by thermal decomposition, heating the mixture so produced to 300°–700° C. and rapidly cooling the products.

2. Process for the manufacture of hydrogen cyanide, which comprises injecting into a stream of formamide vapour a solution of a substance selected from the group which consists of phosphoric acid and compounds yielding phosphoric acid by thermal decomposition, heating the mixture so produced to 450°–650° C. for less than eight seconds and rapidly cooling the products.

3. Process for the manufacture of hydrogen cyanide, which comprises injecting into a stream of formamide vapour a solution of phosphoric acid, heating the mixture so produced to 300°–700° C. and rapidly cooling the products.

4. Process for the manufacture of hydrogen cyanide, which comprises injecting into a stream of formamide vapour a solution of an inorganic phosphate, heating the mixture so produced to 300°–700° C. and rapidly cooling the products.

5. Process for the manufacture of hydrogen cyanide, which comprises injecting into a stream of formamide vapour a solution of an organic phosphate, heating the mixture so produced to 300°–700° C. and rapidly cooling the products.

6. Process for the manufacture of hydrogen cyanide, which comprises injecting into a stream of formamide vapour a solution of phosphoric acid in formamide in amount such that the resulting mixture contains 0.2–2% of phosphoric acid, heating the said mixture to 450°–650° C. for less than eight seconds and rapidly cooling the products.

7. Process for the manufacture of hydrogen cyanide, which comprises injecting into a stream of formamide vapour a solution of an ammonium phosphate in amount such that the resulting mixture contains the equivalent of 0.2–2% of phosphoric acid, heating the said mixture to 450°–650° C. for less than eight seconds and rapidly cooling the products.

8. Process for the manufacture of hydrogen cyanide, which comprises injecting into a stream of formamide vapour a solution of a trialkyl phosphate in amount such that the resulting mixture contains the equivalent of 0.2–2% of phosphoric acid, heating the said mixture to 450°–650° C. for less than eight seconds and rapidly cooling the products.

9. Process for the manufacture of hydrogen cyanide, which comprises injecting into a stream of formamide vapour mixed with ammonia a solution of a substance selected from the group which consists of phosphoric acid and compounds yielding phosphoric acid by thermal decomposition, heating the mixture so produced to 300°–700° C. and rapidly cooling the products.

10. Process for the manufacture of hydrogen cyanide, which comprises injecting into a stream of formamide vapour mixed with carbon monoxide a solution of a substance selected from the group which consists of phosphoric acid and compounds yielding phosphoric acid by thermal decomposition, heating the mixture so produced to 300°–700° C. and rapidly cooling the products.

11. Process for the manufacture of hydrogen cyanide, which comprises injecting into a stream of formamide vapour mixed with 50–150% of its volume of ammonia a solution of a dehydrating catalyst which is a compound containing the trivalent radicle ($PO_4$), the amount of catalyst solution injected being such that the resulting mixture contains the equivalent of 0.2–2% phosphoric acid (calculated on the amount of formamide in the mixture), heating the said mixture to 450°–650° C. for less than eight seconds and rapidly cooling the products.

12. Process for the manufacture of hydrogen cyanide, which comprises injecting into a stream of formamide vapour mixed with 50–150% of its volume of carbon monoxide a solution of a dehydrating catalyst which is a compound containing the trivalent radicle ($PO_4$), the amount of catalyst solution injected being such that the resulting mixture contains the equivalent of 0.2–2% phosphoric acid (calculated on the amount of formamide in the mixture), heating the said mixture to 450°–650° C. for less than eight seconds and rapidly cooling the products.

LEONARD FALLOWS.
ERIC VERNON MELLERS.

REFERENCES CITED

The following references are of record in the file of this patent:

UNITED STATES PATENTS

| Number | Name | Date |
|---|---|---|
| 1,712,297 | Fick | May 7, 1929 |
| 2,309,034 | Barr | Jan. 19, 1943 |
| 2,364,145 | Huppke | Dec. 5, 1944 |

FOREIGN PATENTS

| Number | Country | Date |
|---|---|---|
| 261,559 | Great Britain | Nov. 25, 1926 |